(12) United States Patent
Dohan

(10) Patent No.: US 7,527,314 B2
(45) Date of Patent: May 5, 2009

(54) VEHICLE GAP GUARD

(76) Inventor: Jewel Dohan, 398 Villa Point Dr., Newport Beach, CA (US) 92660

( * ) Notice: Subject to any disclaimer, the term of this patent is extended or adjusted under 35 U.S.C. 154(b) by 128 days.

(21) Appl. No.: 11/557,018

(22) Filed: Nov. 6, 2006

(65) Prior Publication Data

US 2007/0108787 A1    May 17, 2007

Related U.S. Application Data

(60) Provisional application No. 60/734,380, filed on Nov. 8, 2005.

(51) Int. Cl.
*B60N 3/08* (2006.01)
*B60N 2/06* (2006.01)

(52) U.S. Cl. .................................... 296/37.8

(58) Field of Classification Search ............. 296/24.34, 296/37.8, 63
See application file for complete search history.

(56) References Cited

U.S. PATENT DOCUMENTS

| | | | | |
|---|---|---|---|---|
| 2,005,198 A | * | 6/1935 | Morrison | 296/37.13 |
| 2,056,202 A | * | 10/1936 | Morrison | 296/153 |
| 3,428,357 A | * | 2/1969 | Lueck | 296/24.34 |
| 3,572,818 A | * | 3/1971 | Lohr | 296/65.05 |
| 3,632,157 A | * | 1/1972 | Lohr | 296/191 |
| 3,648,306 A | * | 3/1972 | Auerbach | 5/94 |
| 4,231,607 A | * | 11/1980 | Bohlin | 296/63 |
| 4,558,900 A | * | 12/1985 | Nagata | 296/152 |
| 5,085,481 A | * | 2/1992 | Fluharty et al. | 296/37.8 |
| 5,110,176 A | * | 5/1992 | Curtis | 296/187.12 |
| 5,207,549 A | * | 5/1993 | Riva | 414/340 |
| 5,228,659 A | * | 7/1993 | Potes et al. | 248/429 |
| 5,435,614 A | * | 7/1995 | Nordberg | 296/64 |
| 5,887,941 A | * | 3/1999 | Kopinski et al. | 297/182 |
| 6,022,072 A | * | 2/2000 | Moyer | 297/182 |
| 6,352,299 B1 | * | 3/2002 | Ames et al. | 296/146.2 |
| 6,629,715 B2 | * | 10/2003 | Oh et al. | 296/63 |
| 6,746,069 B1 | * | 6/2004 | McKenzie | 296/63 |
| 2007/0241581 A1 | * | 10/2007 | Martin | 296/37.8 |

FOREIGN PATENT DOCUMENTS

| | | | |
|---|---|---|---|
| FR | 2603532 A1 | * | 3/1988 |
| JP | 04110147 A | * | 4/1992 |
| WO | WO 8807458 A1 | * | 10/1988 |

* cited by examiner

*Primary Examiner*—Glenn Dayoan
*Assistant Examiner*—Paul A Chenevert
(74) *Attorney, Agent, or Firm*—Hani Z. Sayed; Rutan & Tucker, LLP

(57) ABSTRACT

A convenience device for use in a motor vehicle is provided. The device may be semi-rigid device that is constructed to fit and occupy the space between the outer most edge of a vehicle seat and the next closest compartment of the vehicle, which in most cases is a center console unit. The device may be a configured in a variety of different embodiments, including for larger and/or smaller vehicle, and may be primarily for aftermarket installation in a vehicle, but whose design functions and capabilities may be applied to original equipment manufacture. Additionally, the device may be constructed of fire retardant material and be made to be removably attached to either the seat of the vehicle or a compartment (such as the center console) in close proximity to the seat. The device may be constructed of any appropriate lightweight material and may be made to custom fit a vehicle or for standard vehicle gap specifications.

19 Claims, 3 Drawing Sheets

VEHICLE GAP GUARD

This application claims priority to U.S. Provisional application Ser. No. 60/734,380 filed Nov. 8, 2005.

FIELD OF THE INVENTION

The invention relates generally to the field of vehicle devices. More specifically, the present invention relates to a vehicle device to be utilized in a vehicle to prevent accidental loss of articles by a user while seated in the vehicle.

BACKGROUND OF THE INVENTION

Motor vehicles typically have a plurality of seating assemblies to support the occupants of that vehicle during transportation of those occupants from one location to another. The typical configuration of most passenger vehicles includes a plurality of front seats, usually in a bucket seat style configuration and a plurality of rear seats, usually in the bench style configuration. However, there has been a growing trend in the vehicle industry to move from the rear bench style rear seat to a bucket style seat. A bucket style seat is a unitary seat usually constructed to fit a single occupant. Typically, there will be space between the bucket seat and any adjoining seat and or compartments in the vehicle. A bench style seat is a longer, coach like configuration wherein an occupant may sit anywhere on the seat and the bench style seat may be configured to hold multiple occupants.

Typically, a motor vehicle includes one or more bucket style seat assemblies for supporting occupants within a passenger compartment. The seat assembly typically includes a seat cushion and a seat back pivotally secured to the seat cushion. The seat back is generally movable between an upright seating position and a generally reclined position, in which the seat back takes a more planar configuration comparative to the seating position. Additionally, another configuration may be a generally stowed position wherein the seat back is rotated into a more compact position which may free up additional storage space within the passenger compartment.

The typical seat has a plurality of parts relating to the seat. For example, a seat may have a seat portion, a side bolster attached to the seat bolster and a support frame connecting the seat to the seat back. Additionally, the seat back may have a back portion, a back side bolster portion and a support frame and rotational means for rotating the seat back relative to the seat portion. Most seats are mounted to a vehicle seat frame structure which allows the seat to be moved in a front and aft position relative to the front of the vehicle. Additionally, the seat frame is typically attached to the frame of the vehicle which may prevent unwanted movement of the seat relative to the movement of the vehicle.

However, with the typical framing structure used in most vehicles, a problem arises in that there is typically space between the outer most portion of the seat, usually the seat bolster, and the next closest compartment in the vehicle. When an occupant is sitting in the seat of a vehicle, often times, loose articles, such as change, receipts, and miscellaneous articles can be lost between the side bolster of the seat and the next closest compartment (sometimes called the center console). Additionally, if an occupant drops something, such as a pen, pencil, cell phone, and/or another hand held device, the occupant must either get off the road, stop and look for the misplaced item, or alternatively, try to find the misplaced article while driving which can be extremely hazardous.

Accordingly, a need therefore still exists for a device that may be effective in eliminating the gaps and spaces between the seat bolsters and the closest compartment such as a center console.

Moreover, a need therefore exists for a cost effective and efficient space and/or gap guard that is fire resistant, simple to use, manufacture and implemented to fit into a plurality of different sized vehicles wherein a singular device may be shaped to fit most makes and models of vehicles. Additionally, a need therefore exists for a space and/or gap guard that may be removably affixed to a seat of a vehicle to prevent misplacement of loose articles.

SUMMARY OF THE INVENTION

The present invention relates to a convenience device for use in a motor vehicle. The device may be a semi-rigid device that is constructed to fit and occupy the space between the outer most edge of a vehicle seat and the next closest compartment of the vehicle, which in most cases is a center console unit. The device may be configured in a variety of different embodiments, including for larger and/or smaller vehicle, and may be primarily for aftermarket installation in a vehicle. Additionally, the device may be constructed of fire retardant material and be made to be removably attached to either the seat of the vehicle or a compartment (such as the center console) in close proximity to the seat. The device may be constructed of any appropriate lightweight material and may be made to custom fit a vehicle or for standard vehicle gap specifications.

In an exemplary embodiment the present invention, a vehicle convenience device is provided. The device has a contoured vehicle space guard, the guard having a top portion, bottom portion, a first and second side portion and a front portion and rear portion. Additionally, the device has at least one of said top portion, bottom portion, first and second portion and front and rear portion adapted for removable attachment to a seat of a vehicle. Moreover, the device is adapted for fitment into the space between a seat of a vehicle and a compartment in close proximity to the seat of the vehicle.

In an exemplary embodiment, the device may be close in proximity to a compartment of a vehicle wherein the compartment is a center console.

In an exemplary embodiment, the device has a guard that may be contoured to compliment the seating contour of the vehicle.

In an exemplary embodiment, the device has a guard that is constructed of foam.

In an exemplary embodiment, the device has a guard that is constructed of plastic.

In an exemplary embodiment, the device has a guard that is comprised of wood, metal, alloy, polyurethane, and any semi-rigid material.

In an exemplary embodiment, the device has a top portion of the device that has a first surface and a second surface wherein the first surface and the second surface are in planar relationship with one another and further wherein the second surface is recessed from said first surface thereby allowing for vertical disengagement of an article from the second surface.

In an exemplary embodiment, the device has a guard that may be constructed of any compressible material whereby upon insertion into a space between the seat of a vehicle and the compartment of a vehicle, said guard will conform to a naturally extended state thereby providing a tight fitment between the seat of the vehicle and the compartment such as the center console.

In an exemplary embodiment, the device has an attachment means to attach the device to the seat of a vehicle.

In an exemplary embodiment, the device has an attachment means wherein the attachment means is a hook and fastener.

In an exemplary embodiment, the device has an attachment means wherein the attachment means is an adhesive.

In an exemplary embodiment, the device may be constructed of a material that may bond with the seats without the need for additional attachment means.

In an exemplary embodiment, the device has an attachment means wherein the attachment means is any attachment whereby the guard may be detachable removed and affixed to the seat for proper spatial engagement between the seat and a compartment of the vehicle.

In an exemplary embodiment of the present invention, a method for using a convenience vehicle device is provided. The method comprising the steps of: providing a contoured vehicle space guard, said guard having a top portion, bottom portion, a first and second side portion and a front portion and rear portion; providing at least one of said top portion, bottom portion, first and second portion and front and rear portion adaptable for removably attaching to a seat of a vehicle; and adapting the space guard for fitment into the space between a seat of a vehicle and a compartment in close proximity to the seat of the vehicle.

In an exemplary embodiment, the method further comprises the step of: inserting said device into a space between the seat of a vehicle and a compartment of a vehicle.

In an exemplary embodiment, the method further comprises the step of: mounting the device in horizontal alignment with the seat of a vehicle and a compartment of a vehicle.

In an exemplary embodiment, the method further comprises the step of: providing a first surface and a second surface wherein the first surface and the second surface are in planar relationship with one another and further wherein the second surface is recessed from said first surface thereby allowing for vertical disengagement of an article from the second surface.

In an exemplary embodiment, the method further comprises the step of: providing an attachment means to attach the device to the seat of a vehicle.

In an exemplary embodiment, the method further comprises the step of: allowing a user to remove the device from a vehicle when desired.

In an exemplary embodiment, the method further comprises the step of: providing an attachment means whereby the attachment means allows for the guard to move in relation to the seat whereby when a user desires to move the seat forward, the guard moves in unison with the seat thereby maintaining the desired protection from misplacement of loose articles.

To this end, in an exemplary embodiment of the present invention, a convenient vehicle device is provided.

In another exemplary embodiment, a convenient vehicle device is provided. The device may be fitted for placement in a vehicle adjacent to a seating apparatus.

Another exemplary embodiment is a vehicle device that does not interfere with the seat belt or any other original manufacture's design or mechanical function of a vehicle.

Yet another exemplary embodiment of the present invention is to provide a convenient device for placement in any vehicle that may eliminate the loss of loose articles.

Still another exemplary embodiment of the present invention is to provide a convenient vehicle device that may be adapted for use in any vehicle.

An exemplary embodiment of the present invention is to provide a convenient vehicle device made of any resilient material.

Yet another exemplary embodiment of the present invention is to provide a convenient vehicle device that may be utilized for OEM use.

Another exemplary embodiment of the present invention is to provide a convenient vehicle device that may be adapted for aftermarket use.

Still another exemplary embodiment of the present invention is to provide a convenient vehicle device that may be constructed of foam.

An exemplary embodiment of the present invention is to provide a convenient vehicle device that may be constructed of plastic.

Yet another exemplary embodiment of the present invention is to provide a convenient vehicle device that may be constructed of wood, metal or any other resilient material.

Still another exemplary embodiment of the present invention is to provide a convenient vehicle device that may be semi-rigid yet still be adaptable for movement with the vehicle seat and be removeable from the vehicle if desired.

Another exemplary embodiment of the present invention is to provide a convenient vehicle device that may be removably attached to the vehicle seat and may be removed from the vehicle if desired by an occupant.

An exemplary embodiment of the present invention is to provide a convenient vehicle device that may be removably attached to the vehicle seat and that does not interfere with normal movement of a seat forward and aft to adjust the driver and/or passenger positioning relative to the front of a vehicle.

Still another exemplary embodiment of the present invention is to provide a convenient vehicle device that does not interfere with normal occupant seating position.

Yet another exemplary embodiment of the present invention is to provide a convenient vehicle device that may not even touch the occupant of the seat, but rather is out of reach by the typical occupant of the vehicle.

Still another exemplary embodiment of the present invention is to provide an convenient vehicle device that does not interfere with the seat belt or any other original mechanical for design feature of a vehicle.

Another exemplary embodiment of the present invention is to provide a convenient vehicle device that may be covered with a leather portion, cloth portion or the like to lend to the aesthetic appeal and durability of the device.

Yet another exemplary embodiment of the present invention is to provide a convenient vehicle device that may be constructed in a plurality of different colors.

Another exemplary embodiment of the present invention is to provide a convenient vehicle device wherein the device is constructed in a plurality of different textures depending on the interior of the vehicle in which it may be placed.

Still another exemplary embodiment of the present invention is to provide a convenient vehicle device that may be adapted for use in a vehicle wherein the device may be retrofitted to fit in any existing vehicle.

Yet another exemplary embodiment of the present invention is to provide a convenient vehicle device that is adapted for vehicle use wherein the device is shaped to fit the contour of an existing seat contour.

In yet another exemplary embodiment of the present invention is to provide a convenient vehicle device that is adapted for vehicle use wherein the device may be removably attached to a vehicle seat and may be removed and placed within another vehicle if desired by the individual user of the device.

Another exemplary embodiment of the present invention is to provide a convenient vehicle device wherein the device is composed of fire retardant material.

Still another exemplary embodiment of the present invention is to provide a convenient vehicle device that may be utilized in a vehicle and wherein the shape of the device may be variable and conform to the shape and/or contour of the vehicle seat.

Yet another exemplary embodiment of the present invention is to provide a convenient vehicle device wherein the device may be machine and/or hand washable.

Still another exemplary embodiment of the present invention is to provide a convenient vehicle device wherein the device may be removed from a vehicle, washed and placed back into the vehicle.

Another exemplary embodiment of the present invention is to provide a convenient vehicle device wherein the device may cling and/or be removably attached to cloth seats of a vehicle.

Yet another exemplary embodiment of the present invention is to provide a convenient vehicle device wherein the device may cling to and/or be removably attached to leather seats of a vehicle.

Still a further exemplary embodiment of the present invention is to provide a convenient vehicle device wherein the device may provide as a barrier such that loose articles are not lost into the space between the vehicle seat and console of the vehicle.

Various objects, features, aspects and advantages of the present invention will become more apparent from the following detailed description of preferred embodiments of the invention, along with the accompanying drawings in which like numerals represent like components.

Additional features and advantages of the present invention are described herein, and will be apparent from the detailed description of the presently preferred embodiments and from the drawings.

DETAILED DESCRIPTION

Figure 1:
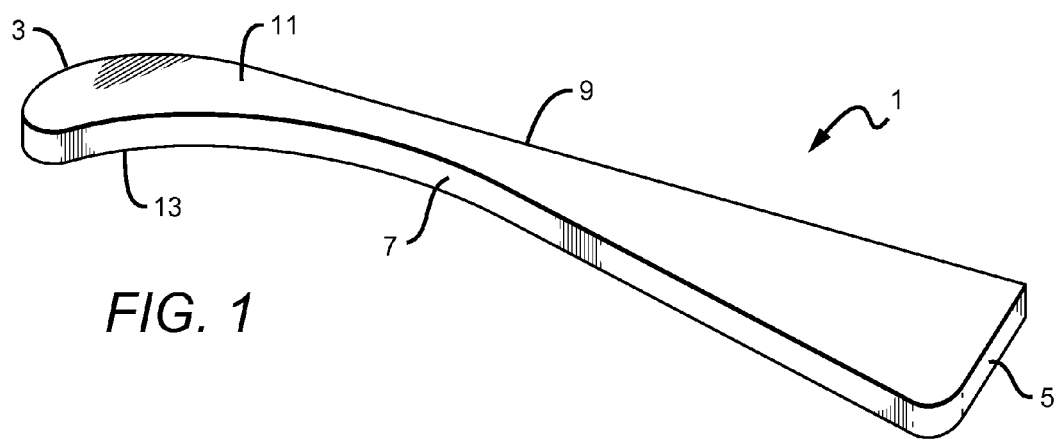
FIG. 1 is a front perspective view of the convenient vehicle device in an exemplary embodiment of the present invention.

Turning now to the drawings wherein elements are identified by numbers and like elements are identified by like numbers throughout the 5 figures, the invention is depicted in FIG. 1 and illustrates a convenient vehicle device 1 to be used in a vehicle.

Referring first to FIG. 1, a convenient vehicle device 1 is provided. The device 1 may have a contoured shape in an exemplary embodiment. The device may include a front portion 3 and a rear portion 5. Additionally, the device 1 may also include a first side portion 7 and a second side portion 9. The first side portion 7 and second side portion 9 may be contained between a top portion 11 and a bottom portion 13.

Figure 5:
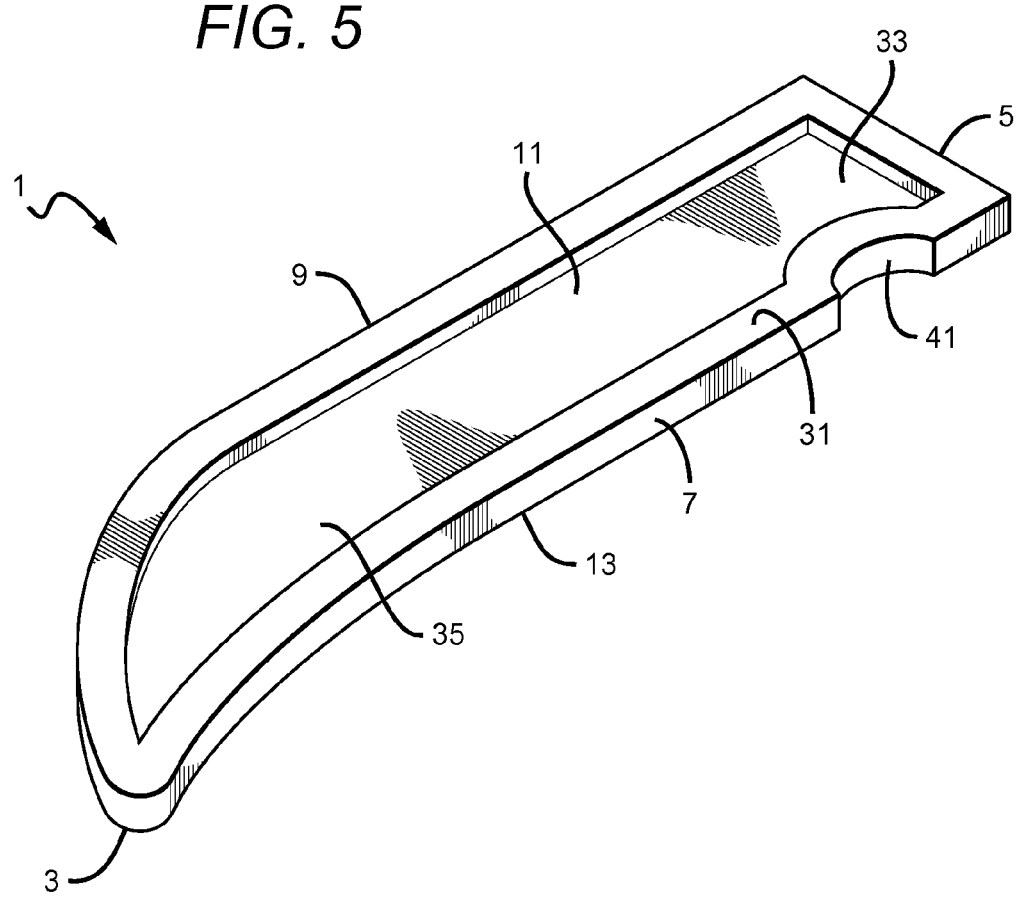
FIG. 5 is another perspective view of the device in an exemplary embodiment of the present invention.

As further illustrated in FIG. 1, the device 1 may be contoured having a generally curved front portion 3, substantially parallel sides portions 7, 9 and a flat rear portion 5. In an exemplary embodiment of the present invention, the contoured device 1 is configured to fit into the space 19 between a seat 21 and another section and/or compartment of a vehicle. In an exemplary embodiment, the section and/or compartment of a vehicle is a center console 25. Most vehicles have a space between this center console 25 and the seat 21. When a user utilizes the seat 21, it is not uncommon for the loose articles contained on the user (typically in pockets of the user) to fall out and be caused to fall in the space 19 between the seat 21 and the center console 25. The device 1 may be manufactured to slot in-between the seat 21 and the center console 25 such that loose articles cannot fall between the seat 21 and the center console. In an exemplary embodiment of the present invention, as shown in FIG. 5, the device may have a top portion 11 that may have a contour to receive loose articles that may have fallen from the individual utilizing the seat 21. As illustrated the top portion 11 of the device may have a first surface 31 and a second surface 33 wherein the first surface is not in planar engagement with the second surface 33. Additionally, the second surface 33 may be recessed to provide a container means 35. The container means 35 may allow for collection and retention of loose articles that might be dropped or misplaced by a user of a vehicle seat 21.

Figure 2:
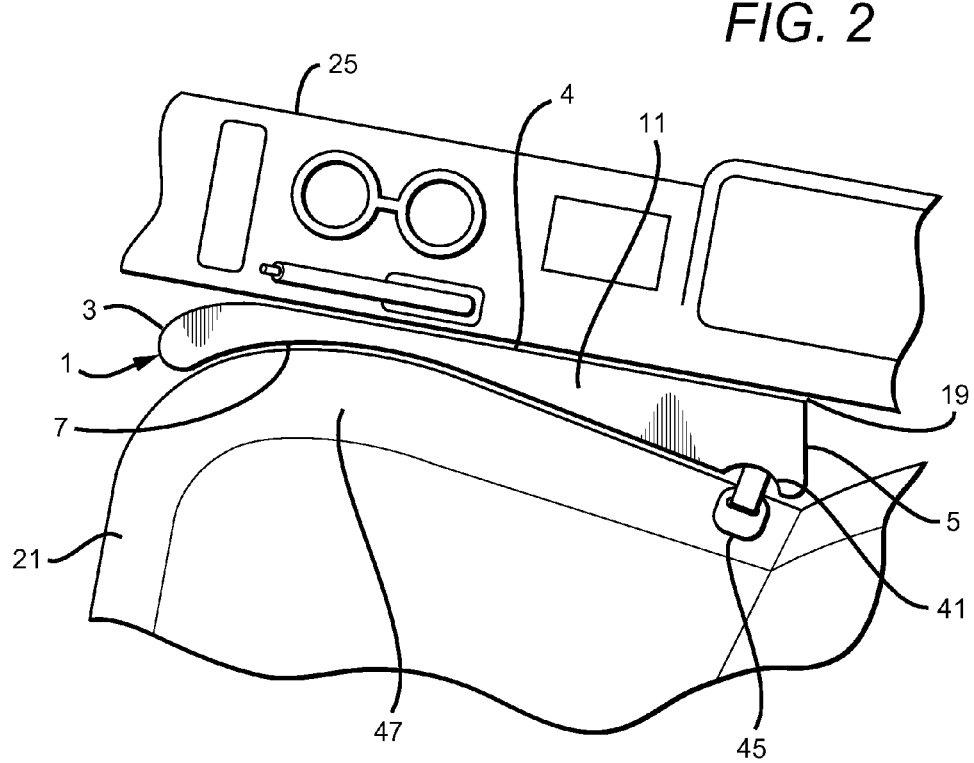
FIG. 2 is a top view of the convenient vehicle device in an exemplary embodiment of the present invention.
Figure 4:
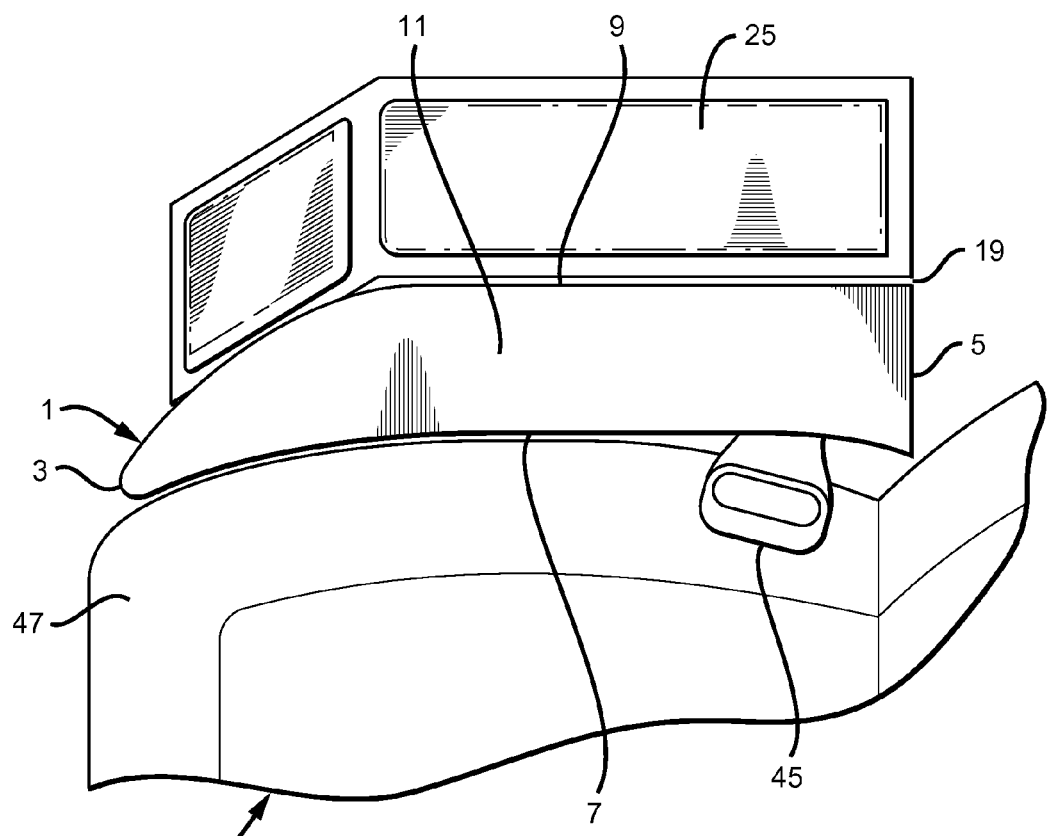
FIG. 4 is another top view of the vehicle device in an exemplary embodiment of the present invention.

As illustrated in FIGS. 2 and 4, the vehicle device 1 may be placed in a position in close proximity to the seat 21 and also to a center console 25 and/or compartment of a typical vehicle. The device may be contoured for adaption and proper fitment of the device into the space that exists between the seat 21 and the console 25. As further illustrated in FIG. 2, the device may have a cutout portion 41 that may provide adequate space for standard vehicle hardware such as vehicle safety harnesses and seat belts 45. Thereby, the device 1 may be placed in a plurality of differing vehicles yet still have adaptability to most vehicles. Additionally, as illustrated in FIG. 2 and FIG. 4, the device 1 may be of varying thicknesses, such that the device may be placed in vehicles having very small spaces between the seat 21 and the console 25. Additionally, because many vehicles have seat bolsters 47 that are the edge of the seat 21, the device may be adapted to accompany a variety of different seat bolsters 47 including sport car bolsters, traditional passenger vehicle bolsters, light truck bolsters, SUV bolsters, large truck bolsters, and even commercial truck seats and bolsters.

Additionally, in an exemplary embodiment of the present invention, the device 1 may be constructed of a plurality of materials. In one embodiment, the device 1 may be constructed of a foam like material. In another exemplary embodiment may be constructed of polyurethane, plastic, wood, metal, alloy, and/or any synthetic or natural material that would be suitable for insertion between the seat 21 and the console 25 of the vehicle.

Figure 3:
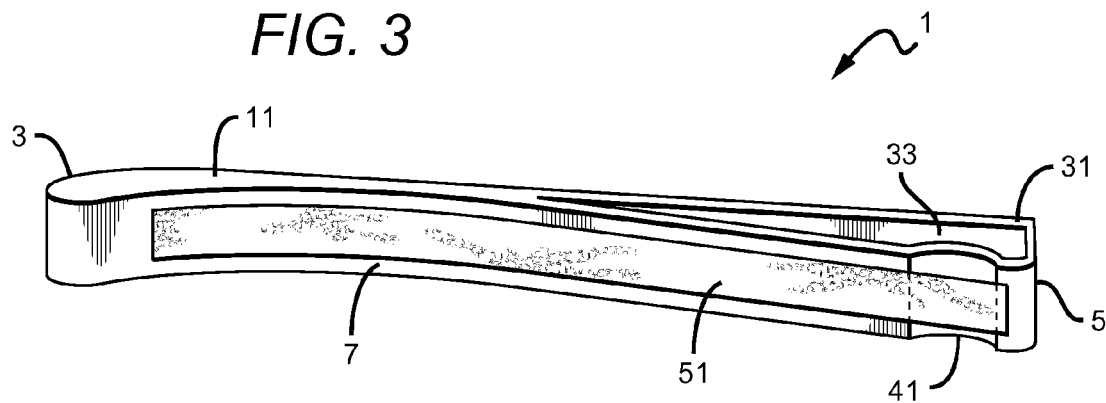
FIG. 3 is a side view of the vehicle device in an exemplary embodiment of the present invention.

FIG. 3 illustrates a the device 1 with an attachment means 51. The device may have an attachment means 51 on the first side portion 7 and/or the second side portion 9. The attachment means 51 may allow for removable attachment and/or fixation of the device 1 to the seat 21 and/or the seat bolster 47. By allowing for removable attachment, the device may accompany movement of the seat 21 relative to the size and need of an occupant. If a shorter occupant must move the seat 21 forward for proper fitment and placement within the vehicle, the device may move with the seat 21 for proper engagement of the device 1 with the space 19 between the seat 21 and the console 25. Moreover, if a larger occupant must move the seat 21 into a rearward position, the device 1 may accompany the rearward movement of the seat 21 because the device may be adhered to the seat 21. In an embodiment, the device 1 may be removably attached to cloth seats, leather seats, or variation thereof. Additionally, in an exemplary embodiment of the present invention, the device 1 may have an attachment means 51 wherein the attachment means is a hook system such as VELCRO. However, it should be understood that a plurality of different attachment means may be utilized including an adhesive, screws, frictional attachment and the like. Additionally, another element of the device 1 may be wherein the device is constructed such that insertion into the space 19 between the seat 21 and the console 25 may require for compacting and compression of the device 1 wherein the natural tendency of the device to expand to its natural state would allow for a tight fitment into the space 19 between the seat 21 and the console 25.

Thus, specific embodiments and applications of a safety device system have been disclosed. It should be apparent, however, to those skilled in the art that many more modifications besides those already described are possible without departing from the inventive concepts herein. The inventive subject matter, therefore, is not to be restricted except in the spirit of the appended claims. The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A vehicle convenience device, the device comprising:
   a contoured vehicle space guard whereby the contour is shaped to fit the contour of an existing vehicle seat, said space guard having a top portion, bottom portion, a first and second side portion and a front portion and rear portion wherein said front portion is contoured to wrap around the edge of a vehicle seat;
   at least one of said top portion, bottom portion, first and second portion and front and rear portion adapted for removable attachment to a seat of a vehicle;
   a cutout portion provided on the vehicle space guard that provides adequate space for fitment around vehicle seatbelts;
   said space guard adapted for fitment into the space between the seat of the vehicle;
   an attachment means whereby the attachment means allows the vehicle space guard to move in relation to the seat whereby when a user desires to move the seat forward, the guard moves in unison with the seat; and
   a compartment in close proximity to the seat of the vehicle such that the space guard is adapted to eliminate the loss of loose articles.

2. The device of claim 1, wherein said compartment in close proximity to the seat of the vehicle is a center console.

3. The device of claim 1, wherein the guard may be contoured to compliment the seating contour of the vehicle.

4. The device of claim 1 wherein the guard is constructed of foam.

5. The device of claim 1 wherein the guard is constructed of plastic.

6. The device of claim 1 wherein the guard is comprised of wood, metal, alloy, polyurethane, and any semi-rigid material.

7. The device of claim 1 wherein the top portion of the device has a first surface and a second surface wherein the first surface and the second surface are in planar relationship with one another and further wherein the second surface is recessed from said first surface thereby allowing for vertical disengagement of an article from the second surface.

8. The device of claim 1 wherein the guard may be constructed of any compressible material whereby upon insertion into a space between the seat of a vehicle and the compartment of a vehicle, said guard will attempt to a natural extended state thereby providing a tight fitment between the seat of the vehicle and the compartment.

9. The device of claim 1 further comprising: an attachment means to art ach the device to the seat of a vehicle.

10. The device of claim 9 wherein said attachment means is a hook and fastener.

11. The device of claim 9 wherein the attachment means is an adhesive.

12. The device of claim 9 wherein the attachment means is any attachment whereby the guard may be detachable removed and affixed to the seat for proper spatial engagement between the seat and a compartment of the vehicle.

13. The device of claim 1 wherein the device is fire retardant.

14. A method for using a convenience vehicle device, said method comprising the steps of:
   providing a contoured vehicle space guard for the retrieval of lost loose articles whereby the contour is shaped to fit the contour of an existing vehicle seat, said space guard having a top portion, bottom portion, a first and second side portion and a front portion and rear portion;
   providing a cutout portion that provides adequate space for standard vehicle hardware;
   providing an attachment means for allowing for removably attaching the vehicle space guard to at least one of a seat or a vehicle compartment portion; and
   providing at least one of said top portion, bottom portion, first and second portion and front and rear portion adaptable for removably attaching to a seat of a vehicle; and
   adapting the space guard for fitment into the space between a seat of a vehicle and a compartment in close proximity to the seat of the vehicle.

15. The method of claim 14, further comprising the step of: inserting said device into a space between the seat of the vehicle and the compartment of the vehicle.

16. The method of claim 14, further comprising the step of: mounting the device in horizontal alignment with the seat of the vehicle and the compartment of the vehicle.

17. The method of claim 14, further comprising the step of:
   providing a first surface and a second surface wherein the first surface and the second surface are in planar relationship with one another and further wherein the second surface is recessed from said first surface thereby allowing for vertical disengagement of an article from the second surface.

18. The method of claim 14, further comprising the step of: allowing a user to remove the device from the vehicle when desired.

19. The method of claim 14, further comprising the step of:
   providing an attachment means whereby the attachment means allows the guard to move in relation to the seat whereby when a user desires to move the seat forward, the guard moves in unison with the seat thereby maintaining the desired protection from misplacement of loose articles.

* * * * *

UNITED STATES PATENT AND TRADEMARK OFFICE
CERTIFICATE OF CORRECTION

PATENT NO.         : 7,527,314 B2
APPLICATION NO.    : 11/557018
DATED              : May 5, 2009
INVENTOR(S)        : Jewel Dohan Page 1 of 1

It is certified that error appears in the above-identified patent and that said Letters Patent is hereby corrected as shown below:

Title Page; item (57);

ABSTRACT:

Line 7, "vehicle" should read "vehicles"

Line 10, "manufacture ." should read "manufacture."

Signed and Sealed this

Twenty-second Day of December, 2009

David J. Kappos
*Director of the United States Patent and Trademark Office*